United States Patent
Takahashi et al.

(10) Patent No.: US 7,653,486 B2
(45) Date of Patent: Jan. 26, 2010

(54) SURROUNDINGS EXHIBITING SYSTEM AND SURROUNDINGS EXHIBITING METHOD

(75) Inventors: Toshiya Takahashi, Soraku-gun (JP); Megumi Itoh, Nara (JP); Mitsukazu Okuda, Ikoma (JP); Takeshi Yamamoto, Soraku-gun (JP); Aki Miake, Nara (JP); Takeshi Doi, Kashiwara (JP)

(73) Assignee: Sharp Kabushiki Kaisha, Osaka (JP)

( * ) Notice: Subject to any disclaimer, the term of this patent is extended or adjusted under 35 U.S.C. 154(b) by 337 days.

(21) Appl. No.: 10/598,106

(22) PCT Filed: Feb. 16, 2005

(86) PCT No.: PCT/JP2005/002835

§ 371 (c)(1),
(2), (4) Date: Aug. 17, 2006

(87) PCT Pub. No.: WO2005/080134

PCT Pub. Date: Sep. 1, 2005

(65) Prior Publication Data

US 2007/0173983 A1 Jul. 26, 2007

(30) Foreign Application Priority Data

Feb. 20, 2004 (JP) .............................. 2004-045462

(51) Int. Cl.
*G08G 1/16* (2006.01)
*G06F 17/10* (2006.01)

(52) U.S. Cl. ........................... 701/301; 701/28; 701/35; 701/207; 348/36; 348/118; 348/148; 340/435; 340/436; 340/932.2; 382/104

(58) Field of Classification Search .................... 701/1, 701/211; 348/148; 340/435, 436
See application file for complete search history.

(56) References Cited

U.S. PATENT DOCUMENTS 6,421,081 B1 * 7/2002 Markus ...................... 348/148

(Continued)

FOREIGN PATENT DOCUMENTS

JP 2000-072019 A 3/2000

(Continued)

OTHER PUBLICATIONS

International Search Report issued in the corresponding International Application No. PCT/JP2005/002835, mailed on May 31, 2005.

*Primary Examiner*—Thomas G Black
*Assistant Examiner*—Lin B Olsen
(74) *Attorney, Agent, or Firm*—Keating & Bennett, LLP (57) ABSTRACT

There is provided a system for showing a multi-directional image of surroundings of transportation device requiring a manual maneuver, when starting the transportation device in a parked state (stop state). The surroundings exhibiting system is constituted by an omnidirectional camera, an ignition instruction detection sensor, a control section including a CPU and a frame memory, and a liquid crystal panel. The omnidirectional camera captures an omnidirectional image of the surroundings around the transportation device in synchronization with a driver's ignition instruction detected by the ignition instruction detection sensor. Further, the captured image data is temporally stored in the frame memory, and the stored image data is sequentially transmitted to the liquid crystal panel so as to be displayed thereon.

6 Claims, 8 Drawing Sheets

U.S. PATENT DOCUMENTS

| | | | |
|---|---|---|---|
| 6,580,373 B1 * | 6/2003 | Ohashi | 340/901 |
| 6,675,006 B1 * | 1/2004 | Diaz et al. | 455/404.1 |
| 2002/0080017 A1 * | 6/2002 | Kumata et al. | 340/436 |
| 2002/0110261 A1 * | 8/2002 | Yanai | 382/104 |
| 2002/0128769 A1 * | 9/2002 | Der Ghazarian et al. | 701/207 |
| 2002/0167589 A1 * | 11/2002 | Schofield et al. | 348/148 |
| 2003/0030724 A1 * | 2/2003 | Okamoto | 348/148 |
| 2003/0080877 A1 * | 5/2003 | Takagi et al. | 340/932.2 |
| 2003/0085999 A1 * | 5/2003 | Okamoto et al. | 348/148 |
| 2003/0090570 A1 * | 5/2003 | Takagi et al. | 348/148 |
| 2003/0095182 A1 * | 5/2003 | Imoto | 348/148 |
| 2003/0222983 A1 * | 12/2003 | Nobori et al. | 348/148 |
| 2004/0119823 A1 * | 6/2004 | Takagi et al. | 348/148 |
| 2004/0196368 A1 * | 10/2004 | Asai | 348/148 |
| 2004/0227647 A1 * | 11/2004 | Yanai | 340/995.1 |
| 2005/0146604 A1 | 7/2005 | Shinada | |
| 2005/0174429 A1 * | 8/2005 | Yanai | 348/148 |
| 2008/0150709 A1 * | 6/2008 | Yamamoto et al. | 340/441 |

FOREIGN PATENT DOCUMENTS

| | | |
|---|---|---|
| JP | 2002-109697 A | 4/2002 |
| JP | 2003-320898 A | 11/2003 |
| JP | 2005014812 A * | 1/2005 |
| JP | 2005-115853 A | 4/2005 |
| WO | WO 2005021330 A1 * | 3/2005 |

\* cited by examiner

SURROUNDINGS EXHIBITING SYSTEM AND SURROUNDINGS EXHIBITING METHOD

TECHNICAL FIELD

The present invention relates to a system which is provided in transportation device such as a vehicle, and which shows, to a driver, surroundings around the vehicle when starting the transporting device that has been in a parked state (stop state).

BACKGROUND ART

Conventionally, various parking-assisting device for parking a vehicle in a desired parking section have been proposed. One realized example thereof is a technique for displaying a rear view image with respect to the vehicle (i.e. an image of a rear area of the vehicle) when reversing the vehicle. Further, disclosed by Japanese Laid-Open Patent Publication Tokukai 2000-72019 (published on Mar. 7, 2000) is a parking assisting device indicating, to a driver, a driving operation amount such as a steering angle, for guiding the vehicle to the parking section.

However, each conventional technique only provides the information for the driver when he/she reverses the vehicle to park. In other words, the conventional technique merely allows a display of the rear view image with respect to the vehicle, or allows the parking assistance based on the rear view image with respect to the vehicle.

Meanwhile, when starting the vehicle in the parked state, safety check is necessary in all the directions rather than only in the rear direction with respect to the vehicle. However, because the conventional technique can merely provide the driver with the rear view image with respect to the vehicle, the information that should be provided for the driver is not always sufficient when starting the vehicle. That is, a shape of the vehicle and/or a parking location possibly cause a blind spot, and safety in the blind spot is hardly checkable for the driver with eyes.

The present invention is made in light of the problem, and its object is to provide a system exhibiting a multi-directional image of surroundings around transportation device to an operator (e.g. a driver, a pilot) thereof when starting the transportation device that has been in the parked state (stop state), the transportation device requiring manual maneuver.

DISCLOSURE OF INVENTION

To solve the problem, a surroundings exhibiting system, of the present invention, that is provided in a transportation device requiring manual maneuver and that shows, to an operator, surroundings of the transportation device in a stop state, the surroundings exhibiting system includes: (i) an image capturing section for capturing multi-directional image of the surroundings of the transportation device; and (ii) a display section for displaying at least part of the image captured by the image capturing section.

With the arrangement, the multi-directional image of the surroundings of the transportation device is captured and displayed. This allows the operator to recognize the surroundings of the transportation device accurately. Therefore, the operator can smoothly and safely start moving the transportation device in the stop state.

Further, the image capturing section may capture an omni-directional image with respect to the transportation device. In this case, the operator can accurately recognize the surroundings around the transportation device. This allows more smooth and safer starting operation of the transportation device in the stop state.

Further, in addition to the arrangement, the surroundings exhibiting system may further include: an ignition instruction detection sensor for detecting an operator's ignition instruction to the transportation device, the image capture by the image capturing section being carried out in synchronization with the ignition instruction.

In this case, the image capture is carried out in synchronization with the operator's ignition instruction. This can shorten an operation period of the surrounding exhibition system, and accordingly can reduce power consumption. Further, the operator can recognize the latest situation of the surroundings by sequentially displaying, on the display section, the image captured in synchronization with the ignition instruction.

Further, instead of the above arrangement, the surroundings exhibiting system may further include: a door unlock detection sensor for detecting unlocking of a door, the image capture by the image capturing section being carried out in synchronization with the unlocking of the door. As another arrangement, the surroundings exhibiting system may further include: a door open/close sensor for detecting opening or closing of the door, the image capture by the image capturing section being carried out in synchronization with the opening or closing of the door.

With these arrangements, the image capture starts in synchronization with the unlocking of the door or the opening and closing of the door. On this account, the image capture can start before the operator takes an operator seat. Therefore, the image required for the check on the surroundings can be prepared before the operator takes the operator seat and is ready to check the surroundings. In other words, the operator can immediately checks the surroundings when carrying out the starting operation of the transportation device.

Further, in the arrangement, the surroundings exhibiting system may further include: (i) a frame memory for storing image data of the image captured by the image capturing section; and (ii) an ignition instruction detection sensor for detecting an operator's instruction to the transportation device, the image data of the image captured by the image capturing section being stored in the frame memory, a most recent image data of the image data stored in the frame memory being displayed on the display section upon the detection of the ignition instruction.

In this case, the operator can immediately check the surroundings when carrying out the starting operation of the transportation device.

To solve the problem, a surroundings exhibiting method, of the present invention, for exhibiting surroundings of transportation device that requires manual maneuver and that is in a stop state, the surroundings exhibiting method include: (i) an image capture step of capturing a multi-directional image of the surroundings of the transportation device; and (ii) a display step of displaying the image captured in the image capture step.

With this arrangement, the multi-directional image of the surroundings of the transportation device is captured and displayed. This allows the operator to recognize the surroundings of the transportation device accurately. Therefore, the operator can smoothly and safely start moving the transportation device in the stop state.

As described above, the surroundings exhibiting system of the present invention includes: (i) the image capturing section for capturing multi-directional image of the surroundings of the transportation device; and (ii) the display section for displaying at least part of the image captured by the image capturing section.

Because the multi-directional image of the surroundings of the transportation device is captured and displayed, the operator can accurately recognize the surroundings of the transportation device. Therefore, the operator can smoothly and safely start moving the transportation device in the stop state.

Further, the surroundings exhibiting method includes: (i) an image capture step of capturing a multi-directional image of the surroundings of the transportation device; and (ii) a display step of displaying at least part of the image captured in the image capture step.

Because the multi-directional image of the surroundings of the transportation device is captured and displayed, the operator can accurately recognize the surroundings of the transportation device. Therefore, the operator can smoothly and safely start moving the transportation device in the stop state.

For a fuller understanding of the nature and advantages of the invention, reference should be made to the ensuing detailed description captured in conjunction with the accompanying drawings.

BEST MODE FOR CARRYING OUT THE INVENTION

One embodiment of the present invention will be described below.

Figure 1:
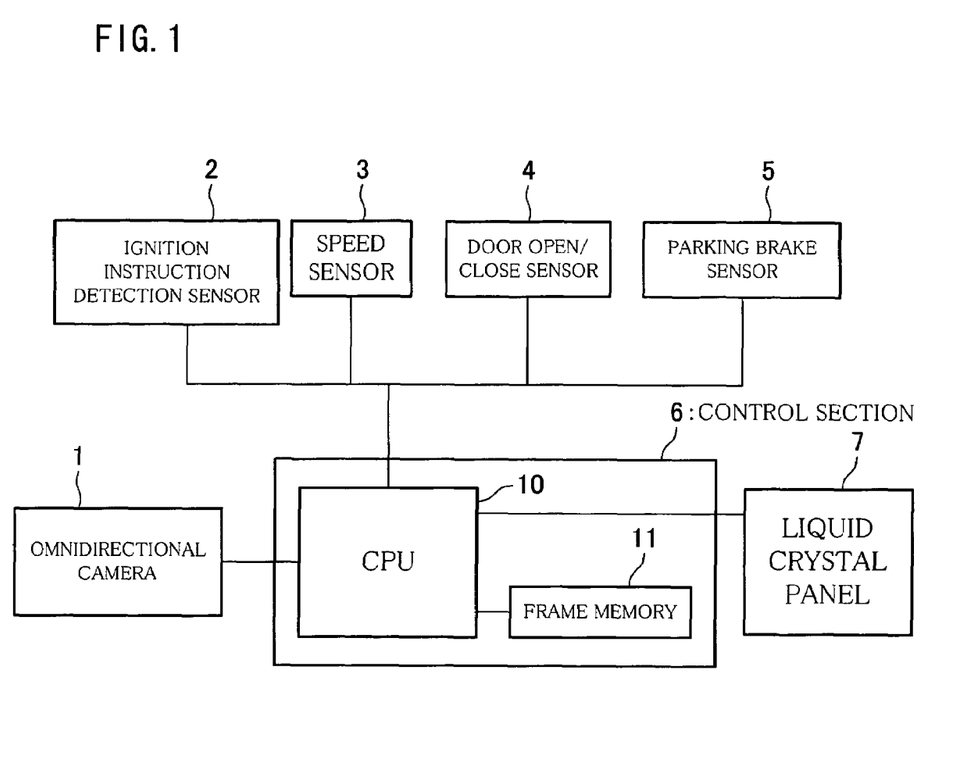
FIG. 1 is a block diagram illustrating a structure of a surroundings exhibiting system according to an embodiment of the present invention.

FIG. 1 is a block diagram schematically illustrating a structure of a surroundings exhibiting system (present system) according to the present embodiment. The present system is provided in a vehicle (transportation device; transportation means) so as to show, to the driver, surroundings around the vehicle when starting the vehicle that has been in the parked state (stop state). With this, the present system assists the driver so that he can start the vehicle more safely, the vehicle having been in the parked state.

As shown in FIG. 1, the present system includes an omnidirectional camera 1, an ignition instruction detection censor 2, a speed sensor 3, a door open/close sensor 4, a parking brake sensor 5, a control section 6, and a liquid crystal panel (display device) 7. The control section 6 includes a CPU 10 and a frame memory 11.

The omnidirectional camera 1 captures an omnidirectional image of the surroundings around the vehicle. The wording "omnidirectional" indicates an angle of 360° with respect to a direction (axis) substantially perpendicular to earth (ground). As the omnidirectional camera 1, the present system adopts an omnidirectional camera that can capture the omnidirectional image of the surrounding in an instant.

Figure 6:
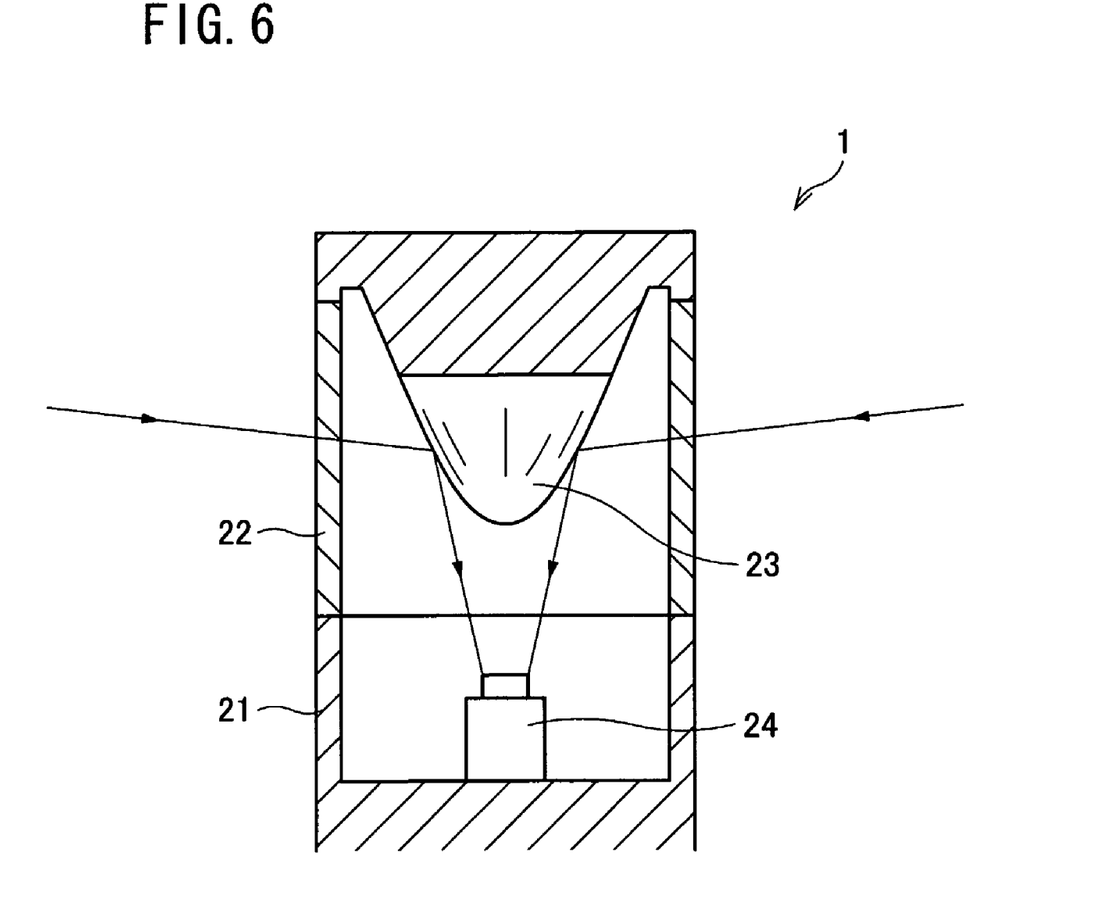
FIG. 6 is a diagram illustrating a structure example of an omnidirectional camera provided in the surroundings exhibiting system according to the embodiment of the present invention.

The following explains an example of the omnidirectional camera 1 with reference to FIG. 6. As shown in FIG. 6, the omnidirectional camera 1 is provided with a camera 24, a convex mirror 23, a casing 21, and a cover member 22 that constitutes a part of the casing 21.

The casing 21 has a substantially cylindrical shape. A sidewall of the casing 21 has a transparent region. The transparent region, which has a predetermined length, is circumferentially constituted by the transparent cover member 22. Inside the casing 21, the convex mirror 23 serving as a reflector is so located as to correspond to a position of the cover member 22 in terms of height. A surface of the convex mirror 23 corresponds to a surface of a convex rotation body obtained by rotating a predetermined convex line about a predetermined axis line (vertical axis line of the casing 21) that will be an optical axis. Examples of the convex line include: an arc line, a hyperbola, a parabola, and the like lines. The convex mirror 23 is so provided as to protrude in a downward direction as a whole. Moreover, the convex mirror 23 is provided so that it reflects incoming light to in the downward direction, the incoming light coming in from outside via the cover member 22.

Inside the casing 21, the camera 24 is provided below the convex mirror 23. The camera 24 serves as an image pickup device, such as a CCD (charge-coupled device) or a CMOS (Complementary Metal-Oxide Semiconductor) image sensor. The camera 24 receives the incoming light that is sent from outside and that is reflected by the convex mirror 23, and outputs an electric signal that corresponds to the light. In the arrangement illustrated in FIG. 6, the convex mirror 23 is a reflector having a convex shape (which is circumferentially round and protruded in one direction (i.e. substantially conical-like shape)), it is possible to capture the omnidirectional (i.e., 360°) image of the surroundings around the vehicle. The wording "omnidirectional camera" generally refers to a camera that can capture an image of an object in a wide angle of 180° or greater with respect to the camera; however the omnidirectional camera of the present description is not limited to this angle.

Figure 7A:
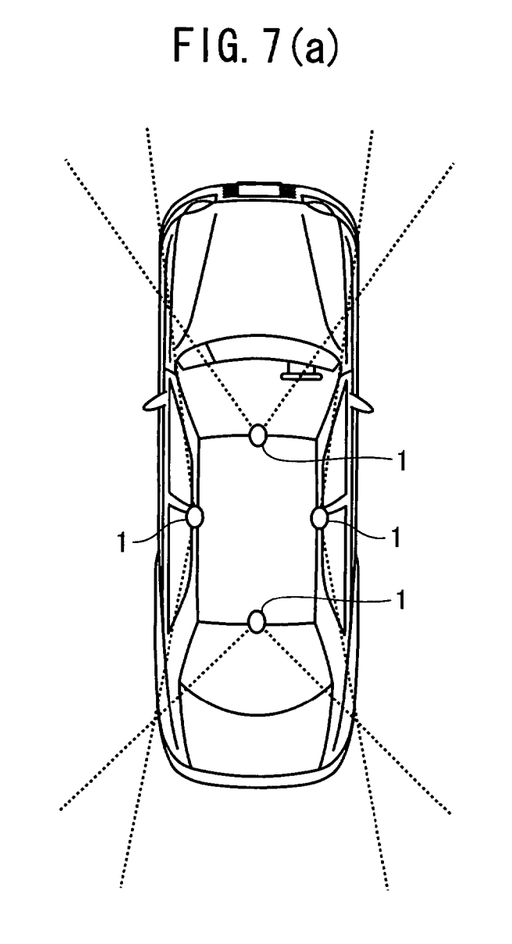
FIG. 7(a) is a diagram illustrating one example of portions in which the omnidirectional camera is provided, the omnidirectional camera being provided in the surroundings exhibiting system according to the embodiment of the present invention.
Figure 7B:
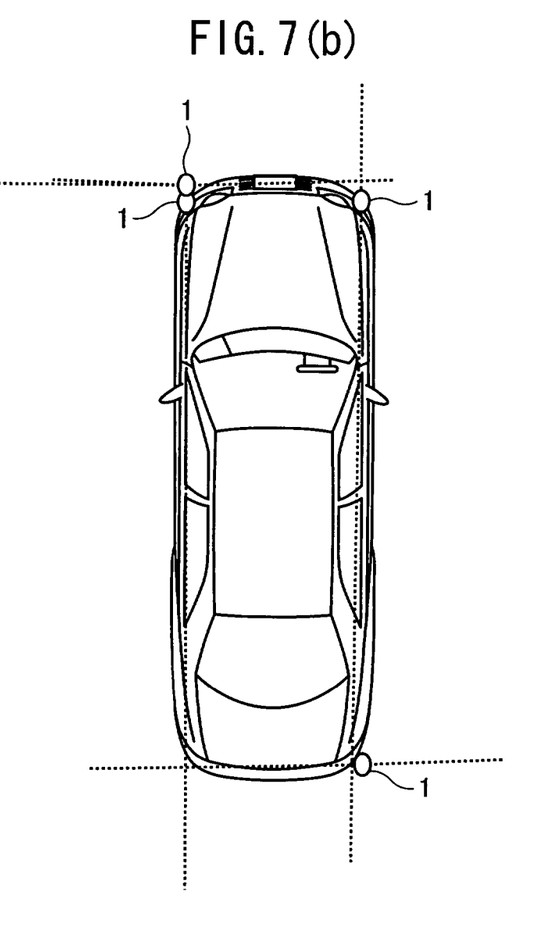
FIG. 7(b) is a diagram illustrating another example of portions in which the omnidirectional camera is provided, the omnidirectional camera being provided in the surroundings exhibiting system according to the embodiment of the present invention.

FIG. 7(a) and FIG. 7(b) illustrate examples of portions in which the omnidirectional cameras 1 are provided. Each broken line in FIG. 7(a) and FIG. 7(b) indicates limitation of an angle covered by each omnidirectional camera 1 for the image capture.

FIG. 7(a) illustrates an example in which the omnidirectional cameras 1 are provided on a roof of the vehicle. Specifically, in order to eliminate the blind spot, the omnidirectional cameras 1 are provided in four sides of the roof of the vehicle, i.e., a front side, a rear side, a left side, and a right side. An advantage in providing the omnidirectional cameras 1 on the roof lies in that an angle of each omnidirectional camera 1 can be kept because the omnidirectional camera 1 on the roof is hardly hit by anything during driving.

FIG. 7(b) illustrates an example in which four omnidirectional cameras 1 are provided in three portions of the vehicle. Specifically, two of the omnidirectional cameras 1 are provided in a front end portion associated with a front passenger seat, one capturing a front view image with respect to the vehicle, the other capturing a lateral view image with respect to the front passenger seat. Further, one of the rest of the omnidirectional cameras 1 is provided in a front end portion associated with a driver seat, and captures a lateral view image with respect to the driver seat. The last one of the omnidirectional cameras 1 is provided in a rear end portion associated with the driver seat, and captures a rear view image with respect to the vehicle. In this case, the blind spot due to the vehicle body is certainly eliminated.

The ignition instruction detection sensor 2 detects a user's engine start instruction, which is carried out by inserting and turning an ignition key. The speed sensor 3 detects speed of the vehicle. The door open/close sensor 4 detects opening and/or closing of a door. The parking brake sensor 5 detects whether or not the parking brake is in a released state.

The display panel 7 serves as a display section (display mean) for displaying (i) the image captured by each omnidirectional camera 1 (i.e. at least part of or a whole of an image captured by the omnidirectional camera 1 or the omnidirectional cameras 1); (ii) information obtained by the sensors 2 through 5; and (iii) other information or image. The liquid crystal panel 7 of the present system has a very wide screen whose aspect ratio (ratio of (i) a width (horizontal side) of a display region, to (ii) a length (vertical side) thereof) is 7:3 or greater. This allows to display together (i) the image captured by each of the omnidirectional cameras 1, and (ii) gauges such as a speed meter, an engine speed meter, a fuel remaining amount gauge.

Figure 2:
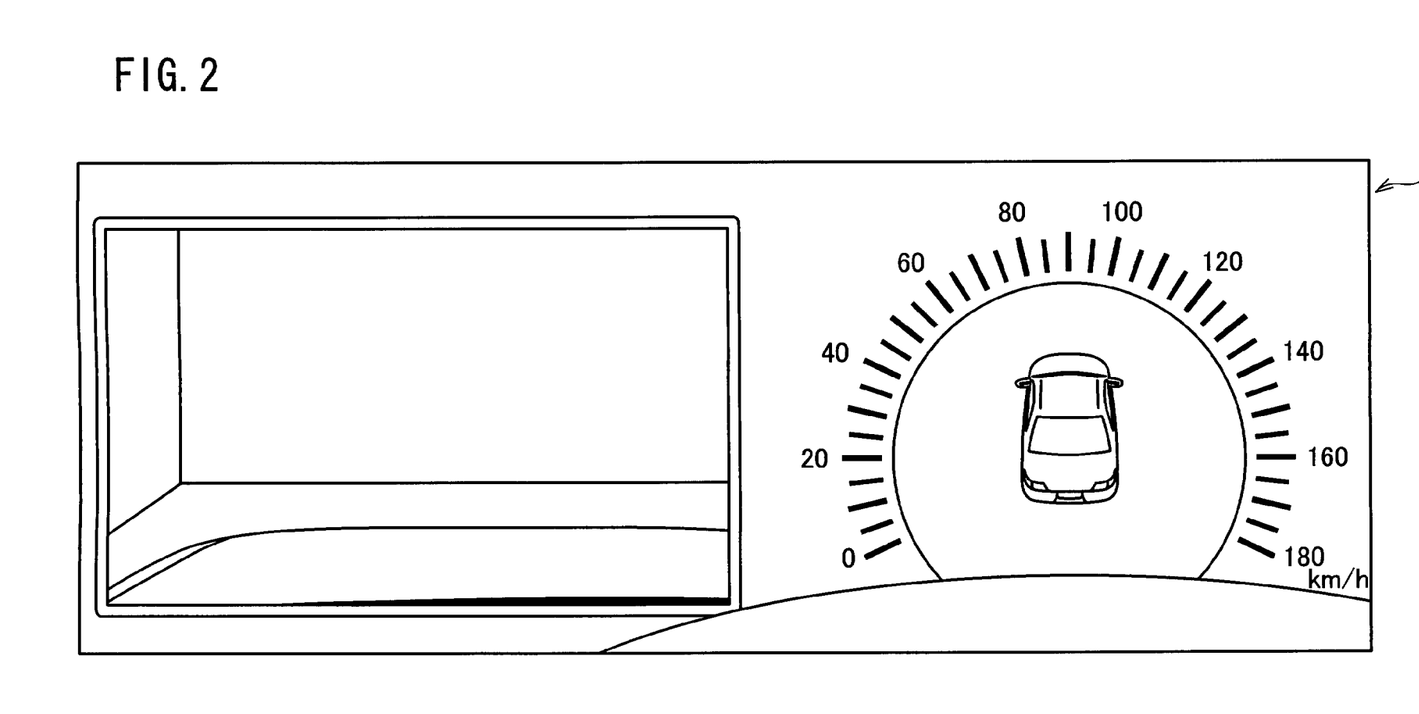
FIG. 2 is an explanatory diagram illustrating one example of images displayed on a liquid crystal panel provided in the surroundings exhibiting system according to the embodiment of the present invention.

FIG. 2 is an explanatory diagram illustrating an example of contents displayed on the liquid crystal panel 7. In the example shown in FIG. 2, displayed on the liquid crystal panel 7 are: (i) the speed meter; (ii) an image indicating a state (hereinafter, referred to as "vehicle state") of the vehicle; and (iii) the image, captured by the omnidirectional camera 1, of the surroundings around the vehicle. The image indicating the vehicle state is displayed together with an image of the vehicle, in a central portion (portion in the vicinity of the speed meter) of the speed meter. The respective images of the vehicle and the vehicle state are not the image data captured by the omnidirectional camera 1, but are respective graphic images (bitmap data) that show the vehicle and the vehicle state and that are stored in an image DB (data base) (not shown). Moreover, the displayed vehicle state is results of the detections carried out by the sensors provided in the vehicle. For example, a detection result by the door open/close sensor 4 is displayed together with the image of the vehicle.

The control section 6 includes the CPU 10 and the frame memory 11. The CPU 10 is a central section of the present system, and controls all the operations of the present system. Specifically, the CPU 10 activates the present system in synchronization with the turning of the ignition key to an ON position, in order to capture the image by using the omnidirectional camera 1 and to display the captured image. The capture and display of the image are carried out according to (i) the detection result of the sensors 2 through 5, and (ii) the like. The frame memory 11 temporally stores the image data of the image captured by the omnidirectional camera 1.

Figure 3:
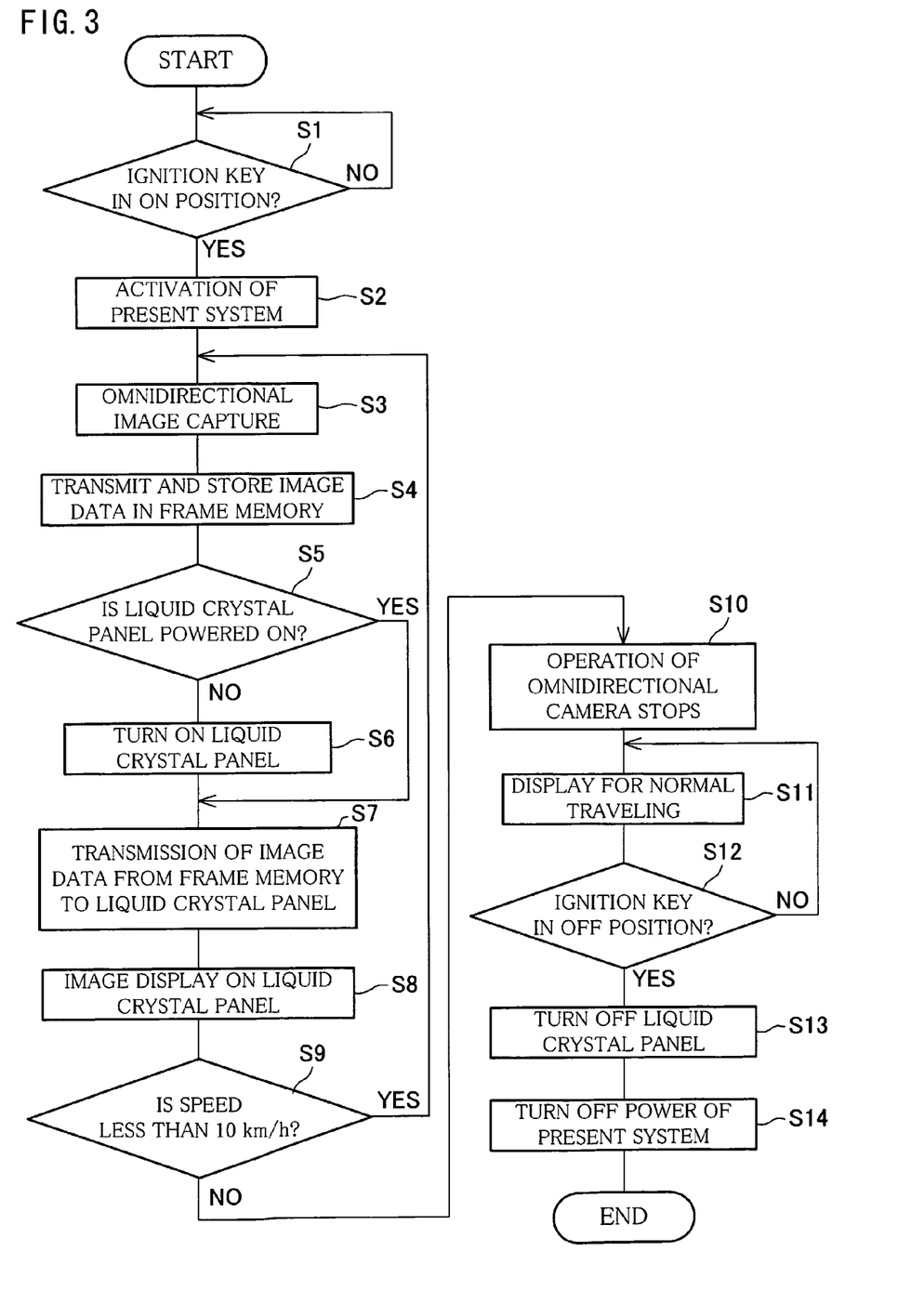
FIG. 3 is a flowchart illustrating one example of processes in the surroundings exhibiting system according to the embodiment of the present invention.

Here, a flow of processes in the present system will be explained. FIG. 3 is a flowchart illustrating the flow of the processes in the present system.

As shown in FIG. 3, during the stop state in which the engine is not in operation, the present system monitors as to whether or not the ignition key is turned to the ON position (S1). In other words, during the stop state in which the engine is not in operation, the CPU 10 monitors, via the ignition instruction detection sensor 2, as to whether or not the ignition key is turned to the ON position.

When the ignition instruction detection sensor 2 detects the turning of the ignition key to the ON position, the CPU 10 activates the present system (S2). In other words, the CPU 10 turns ON power to the present system. Electric power for the present system is supplied from an engine start battery of the vehicle.

Next, the CPU 10 controls the omnidirectional camera 1 to carry out the omnidirectional image capture (S3). The CPU 10 converts image data of the image captured by the omnidirectional camera 1, to image data suitable for the display on the liquid crystal panel 7, and transmits the converted image data to the frame memory 11 for the purpose of the temporary storage therein (S4).

Next, the CPU 10 turns ON the liquid crystal panel 7 (S6). As described below, until the speed of the vehicle reaches 10 km/h, the present system repeats (i) the image capture by using the omnidirectional camera 1, and (ii) the display of the captured image. Therefore, in cases where the power of the liquid crystal panel 7 has already been ON, the process in S6 is skipped (S5).

Next, the CPU 10 sequentially transmits the image data, which is stored in the frame memory 11, to the liquid crystal panel 7. With this, the image captured by the omnidirectional camera 1 is displayed on the liquid crystal panel 7 (in accordance with the image data) (S8). In the present system, the image captured by the omnidirectional camera 1 is displayed on the liquid crystal panel 7 in the following manner. That is, an image corresponding to a predetermined angular range is displayed (the angular range is based on the vehicle as center). (e.g. if the image corresponding to an angular range of 30°, the image between, e.g. 0° and 30° with respect to the vehicle as the center is displayed.) Then, an image of another direction (capturing direction of an image) is displayed on and on. With this, the surroundings around the vehicle can be checked by, for example, rotating the captured image at the angle of 360° with the vehicle centered.

Further, on this occasion, the CPU 10 monitors the speed of the vehicle via the speed sensor 3 (S9). When the speed of the vehicle is less than 10 km/h, the CPU 10 judges that the starting operation (for starting the transportation device) by the driver is not completed, and repeats the processes from S3. In other words, the CPU 10 causes the omnidirectional camera 1 to continue the image capture, and causes the liquid crystal panel 7 to display the captured data sequentially. On this account, the image information displayed on the liquid crystal panel 7 is always the most recently captured one.

Meanwhile, when the speed of the vehicle reaches or exceeds 10 km/h in S9, the CPU 10 judges that the starting operation by the driver is completed, and stops the operation of the omnidirectional camera 1 (S10). Then, the CPU 10 causes the liquid crystal panel 7 to display image information suitable for ordinary traveling of the vehicle (S11). Here, the image information suitable for ordinary traveling indicates, for example, (i) the display of the gauges such as the speed meter, the engine speed meter, and the fuel remaining amount gauge; (ii) a display of navigation information; and (iii) the like.

While carrying out the image display suitable for the ordinary traveling, the CPU 10 monitors via the ignition instruction detection sensor 2 whether or not the ignition key is turned to an OFF position (S12). While the ignition key is in the ON position, the operation in S11 (i.e., the display of the image information suitable for the ordinary traveling) continues. When the ignition key is turned to the OFF position, the CPU 10 turns OFF the liquid crystal panel 7 (S13), and turns OFF the power to the present system (S14). This ends the operations of the present system.

As described above, the present system shows the omnidirectional image to the driver when starting the vehicle in the parked state. With this, the driver can check, through the image captured by the omnidirectional camera 1, e.g., (i) safety in an area which is difficult to check visually for the operator, or (ii) an area in a direction in which it is difficult to check visually for the operator. In other words, the present system thus provided in the vehicle allows easy and effective safety check for the surroundings around the vehicle when starting the vehicle, and accordingly allows a safer starting operation (driving) of the vehicle in the parked state.

Figure 4:
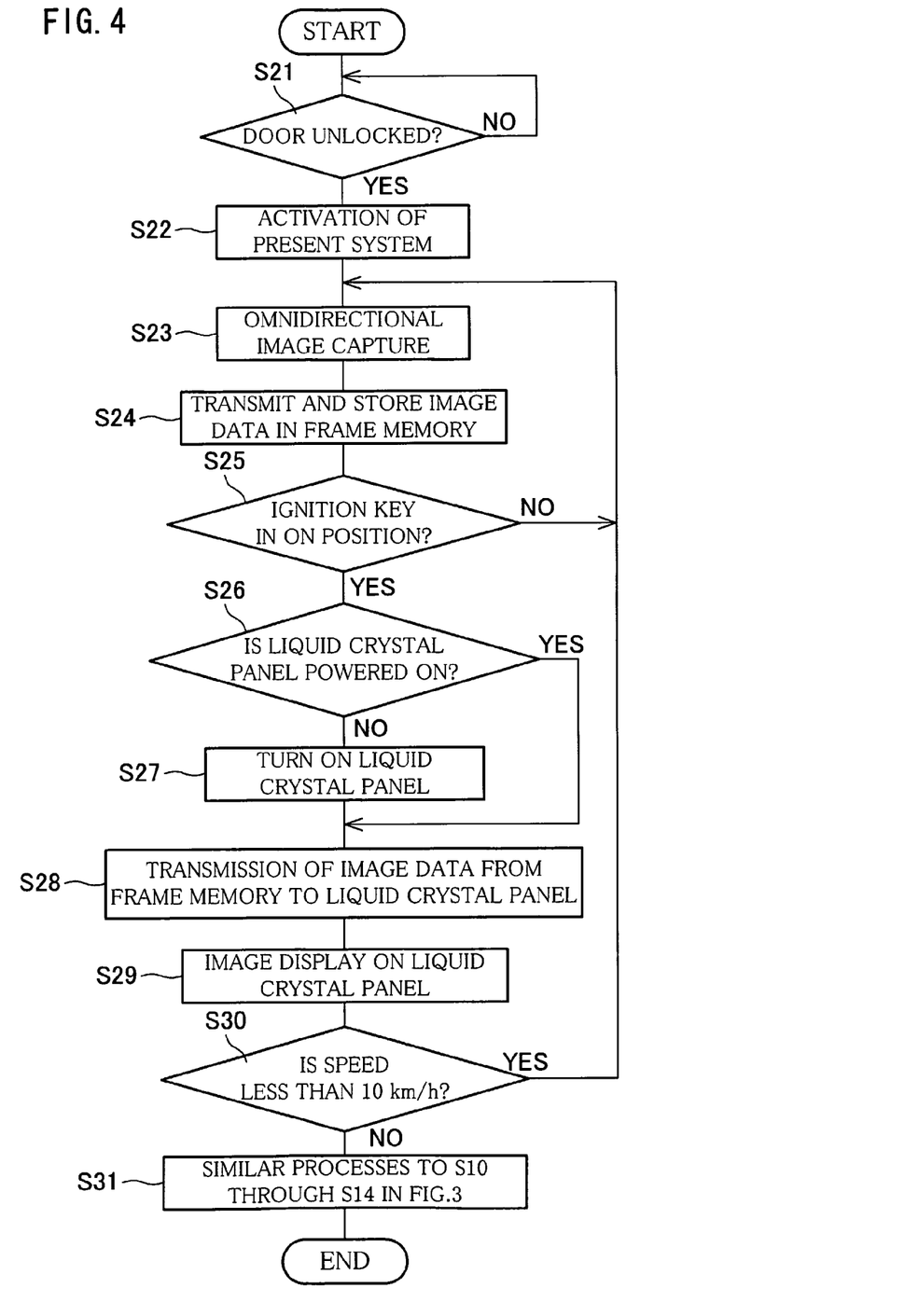
FIG. 4 is a flowchart illustrating another example of processes in the surroundings exhibiting system according to the embodiment of the present invention.

The present system is not limited to the exemplary arrangement in which the present system is activated in response to the turning of the ignition key to the ON position: for example, the present system may be activated in response to unlocking of a door of the driver seat. The unlocking may be detected by a door unlocking sensor (not shown) for detecting the unlocking of the door. FIG. 4 is a flowchart illustrating an example of an operation of the present system having such a structure.

As shown in FIG. 4, during the parked state in which the engine is not in operation, the CPU 10 monitors unlocking of the door (S21). The unlocking may be carried out by insertion of a key or by a keyless entry system.

When the door unlocking sensor detects the unlocking of the door, the CPU activates the present system (S22).

Next, the CPU 10 controls the omnidirectional cameras 1 to carry out the omnidirectional image capture (S23). The CPU 10 converts the image data of the image captured by the omnidirectional camera 1, to image data suitable for the display on the liquid crystal panel 7, and transmits the converted image data to the frame memory 11 for the purpose of the temporary storage therein (S24).

Here, the CPU 10 monitors via the ignition instruction detection sensor 2 whether or not the ignition key is turned to the ON position (S25). Until the ignition key is turned to the ON position, the processes in S23 and S24 are repeated.

Meanwhile, the CPU 10 carries out turning ON of power of the liquid crystal panel 7 (S27). As described later, until the speed of the vehicle reaches 10 km/h, the present system repeats (i) the image capture by using the omnidirectional camera 1, and (ii) the display of the captured image. Therefore, in cases where the power of the liquid crystal panel 7 has already been ON, the process in S27 is skipped (S26).

Next, the CPU 10 instructs that the most recently captured image data in the frame memory 11 (S28) is transmitted sequentially to the liquid crystal panel 7. With this, the liquid crystal panel 7 displays the image captured most recently by the omnidirectional camera 1 (S29).

Further, on this occasion, the CPU 10 monitors the speed of the vehicle via the speed sensor 3 (S30). When the speed of the vehicle is less than 10 km/h, the CPU 10 judges that the starting operation by the driver is not completed, and repeats the operations from S23. In other words, the CPU 10 causes the omnidirectional camera 1 to continue the image capture, and causes the liquid crystal panel 7 to display the captured data sequentially. On this account, the image information displayed on the liquid crystal panel 7 is always the most recently captured one.

On the other hand, in cases where the speed of the vehicle reaches or exceeds 10 km/h in S30, the CPU 10 judges that the starting operation by the driver is completed, and carries out processes similar to the processes in S10 through S12 (shown in FIG. 3) (S31), and then ends the operation of the present system.

Figure 5:
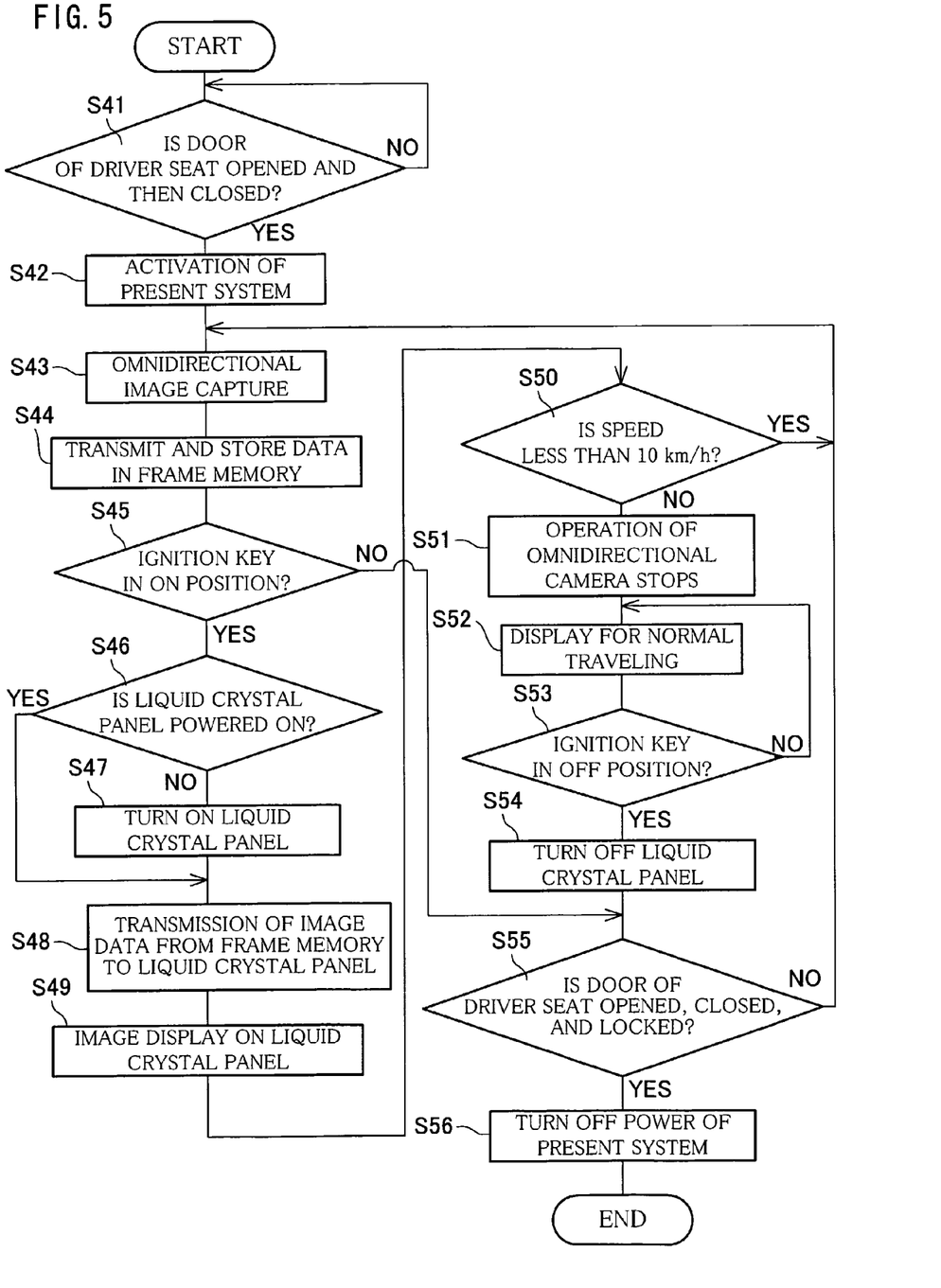
FIG. 5 is a flowchart illustrating still another example of processes in the surroundings exhibiting system according to the embodiment of the present invention.

Alternatively, the present system may be activated in response to opening or closing of the door of the driver seat (i.e., be activated by opening or closing the door). FIG. 5 is a flowchart illustrating an example of the operation of the present system in such a case.

In FIG. 5, during the parked state in which the engine is not in operation, the CPU 10 monitors the opening and closing of the door of the drivers seat (S41). Specifically, during the parked state in which the engine is not in operation, the CPU 10 monitors the opening and/or closing of the door, via the door open/close sensor 4.

When the door open/close sensor 4 detects the opening or closing the door, the CPU 10 activates the present system (S42).

Next, the CPU 10 controls the omnidirectional camera 1 to carry out the omnidirectional image capture (S43). The CPU 10 converts the image data, captured by the omnidirectional camera 1, to image data suitable for the display on the liquid crystal panel 7, and transmits the converted image data to the frame memory 11 for the purpose of the temporary storage therein, (S44).

Here, the CPU 10 monitors, via the ignition instruction detection sensor 2, the turning of the ignition key to the ON position (S45). In cases where the ignition key is not in the ON position, the CPU 10 judges whether or not the door is re-opened, re-closed, and locked (S55). In cases where the door is not re-opened, re-closed, and locked, the processes from S43 are repeated. In contrast, in cases where the door is re-opened, re-closed, and locked, the CPU 10 turns OFF the power of the present system (S56), and ends the operation of the present system.

Meanwhile, in cases where the ignition key is turned to the ON position in S45, the CPU 10 turns ON the liquid crystal panel 7 (S47). Note that, as described below, until the speed of the vehicle reaches 10 km/h, the present system repeats (i) the image capture by the omnidirectional camera 1, and (ii) the display of the captured image. Therefore, in cases where the power of the liquid crystal panel 7 has already been ON, the process in S47 is skipped (S46).

Next, the CPU 10 instructs that the most recently captured image data in the frame memory 11 is sequentially transmitted to the liquid crystal panel 7 (S48). With this, the liquid crystal display 7 displays the image captured most recently by the omnidirectional camera 1 (S49).

Further, on this occasion, the CPU 10 monitors the speed of the vehicle via the speed sensor 3 (S50). When the speed of the vehicle is less than 10 km/h, the CPU 10 judges that the starting operation by the driver is not completed, and repeats the processes from the S43. In other words, the CPU 10 causes the omnidirectional camera 1 to continue the image capture, and causes the liquid crystal panel 7 to display the captured data sequentially. On this account, the image information displayed on the liquid crystal panel 7 is always the most recently captured one.

Meanwhile, when the speed of the vehicle reaches or exceeds 10 km/h in the S50, the CPU 10 judges that the starting operation by the driver is completed, and stops the operation of the omnidirectional camera 1 (S51). Then, the CPU 10 causes the liquid crystal panel 7 to display the image information suitable for an ordinary traveling of the vehicle (S52).

While carrying out the image display suitable for the ordinary traveling, the CPU 10 monitors via the ignition instruction detection sensor 2 whether or not the ignition key is turned to the OFF position (S53). While the ignition key is in the ON position, the operation in the S52 (i.e., the display of the image information suitable for the ordinary traveling) continues.

When the ignition key is turned to the OFF position, the CPU 10 turns OFF the power of the liquid crystal panel 7 (S54), and waits for the opening, closing, and locking of the door of the driver seat (S55). Until the door of the driver seat is opened, closed, and locked, the processes from S43 are repeated.

When the door of the driver seat is opened, closed, and locked, the CPU 10 turns OFF the power of the present system (S56), and ends the operation of the present system.

As described above, the present system starts the image capture, which is carried out by the omnidirectional camera 1, in synchronization with the unlocking of the door of the driver seat, or with the opening or closing of the door. With this, the surrounding around the vehicle can be displayed on the liquid crystal panel 7 immediately after the driver turns the ignition key to the ON position. This shortens time required for the check of the surrounds around the vehicle.

In the present system, the CPU 10 stops the operation of the omnidirectional camera 1 when the speed of the vehicle reaches or exceeds 10 km/h. However, the present invention is not limited to this timing for stopping the operation of the omnidirectional camera 1. For example, the operation of the omnidirectional camera 1 may be stopped when the speed of the vehicle reaches or exceeds other speed (e.g., 8 km/h or 12 km/h). Alternatively, the operation of the omnidirectional camera 1 may be stopped when the parking brake is released. In this case, before starting the vehicle, the driver may recognize the surroundings in accordance with the image captured by the omnidirectional camera 1, and release the parking brake. Alternatively, the operation of the omnidirectional camera 1 may be stopped when a gearshift is shifted to a drive position. In this case, the driver may check the surrounding in accordance with the image captured by the omnidirectional camera 1 before shifting the gearshift to the drive position and starting the vehicle.

Moreover, the operation of the omnidirectional camera 1 may be stopped in response to a driver's instruction of ending the image capture carried out by the omnidirectional camera 1, the driver's instruction inputted via an input section (not shown), which is provided to receive the driver's instruction. For such an input section, the liquid crystal panel 7 can be also used. Specifically, the liquid crystal panel 7 may display items (parameters) that the driver can input, and the driver may touch a desired item of the displayed items so as to input the instruction to the present system. As another arrangement, the present system may additionally include, for example, a key input device or a mouse, each of which is used as the input section for the present system. Moreover, in cases where the present system is provided with an audio system and/or a navigation system, the input section of the systems may be used as an input section (operation section) for the audio system and/or a navigation system. Moreover, in cases where the present system is provided with a system for electrically adjusting an angle, or the like, of a side mirror (fender mirror), the input section may be used as operation means for electrically adjusting the angle of the side mirror).

Further, in cases where the present system includes such an input section, the present system may be so arranged that, via the input section, the driver can give instructions such as (i) the activation and inactivation of the present system, (ii) pause of the displayed image, and (iii) zoom of the displayed image. Moreover, the present system may be so arranged that the driver can carry out various settings, via the input section, such as a setting of activation timing of the present system; and a setting of the speed judged as the completion of the starting operation.

Further, in the present system, the frame memory 11 stores the image data of the image captured by the omnidirectional camera 1; however, the frame memory 11 may store only the most recently captured data. Specifically, in the frame memory 11, previous image data may be deleted and only present image data may be stored. This allows the frame memory 11 to have a smaller storage volume.

The omnidirectional camera 1 used in the present system is a camera that can capture the omnidirectional image in an instant, but the present invention is not limited to this. For example, the omnidirectional camera 1 may be such a camera that rotates about a rotation axis perpendicular to earth (ground) in order to sequentially capture images in all the directions. Alternatively, the omnidirectional camera 1 may be such a camera that captures an image that is reflected on a rotatable reflector while the reflector rotates, the reflector being rotatable about an image capture axis and provided such that the reflector is on the image capture axis of the camera and has a tilt angle with respect to the image capture axis (the image capture axis is an image capture direction of the camera and which is perpendicular to earth (ground)).

The portions in which the omnidirectional cameras 1 are provided are not limited to the portions shown in FIG. 7(a) and FIG. 7(b). For example, the omnidirectional camera 1 may be provided in a bottom portion of the vehicle. In this case, it is possible to capture an omnidirectional image of surroundings around a lower portion of the vehicle with the use of a single camera, the surroundings around the lower portion tending to be the blind spot. Further, the omnidirectional camera 1 may be stored within the vehicle and exposed to outside of the vehicle only when carrying out the omnidirectional image capture.

Figure 8:
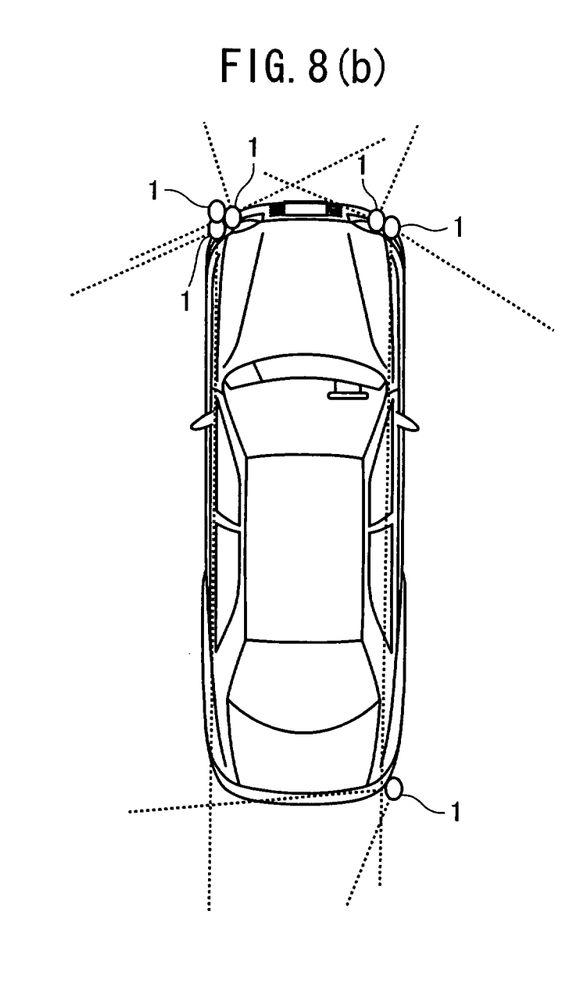
FIG. 8(a) is a diagram illustrating still another example of portions in which the omnidirectional camera is provided, the omnidirectional camera being provided in the surroundings exhibiting system according to the embodiment of the present invention.
FIG. 8(b) is a diagram illustrating yet another example of portions in which the omnidirectional camera is provided, the omnidirectional camera being provided in the surroundings exhibiting system according to the embodiment of the present invention.

Further, the structure of the omnidirectional camera 1 is not limited to the structure explained with reference to FIG. 6. For example, the omnidirectional camera 1 may be such a camera that has a plurality of standard lenses or wide-angle lenses. Examples of such a camera having the standard lenses or the wide-angle lenses include a CCD and a CMOUS image sensor. In this case, the omnidirectional image capture may be carried out by using a plurality of such cameras provided in different positions of the vehicle, and the omnidirectional image can be shown to the driver by combining images captured by the cameras. Further, in this case, the cameras may be provided in, for example, a front left portion, a front right portion, a rear left portion, and a rear right portion of the vehicle. The cameras thus provided in the portions allow easy image capture of the area within the blind spot and of the area in the direction in which the blind spot occurs, thereby improving safety. FIG. 8(a) and FIG. 8(b) illustrate examples in which the cameras are provided in these portions. Note that each camera shown in FIG. 8(a) and FIG. 8(b) uses the standard lenses.

FIG. 8(a) shows an example of an arrangement in which, for the image capture in at least four directions (front, rear, left, and right with respect to the vehicle), four cameras are provided in the following portions of the vehicle. That is, in the front end portion associated with the front passenger seat, two of the cameras are provided; one carrying out the image capture in the front direction, the other carrying out the image capture of the side with respect to the front passenger seat. Moreover, in the front end portion associated with the driver seat, one of the rest of the cameras is provided for the image capture of the side with respect to the drivers seat. Moreover, in the rear end associated with the drivers seat, the last one of the cameras is provided for the image capture in the rear direction.

FIG. 8(b) shows an example of an arrangement in which a larger number of the cameras are provided as compared with the example of FIG. 8(a) for acquirement of a more detailed omnidirectional image. Specifically, in addition to the cameras provided in a similar manner to the example of FIG. 8(a), more cameras are provided in the front end portion associated with the front passenger seat, and in the front end portion associated with the drivers seat. The cameras additionally provided in the front end portion associated with the front passenger seat capture a front view image with respect to the front passenger seat, and the camera additionally provided in the front end portion associated with the driver seat captures a front view image with respect to the vehicle. By using three or more cameras for the image capture in the front direction in this way, the captured image can have no blind spot.

Further, as the omnidirectional camera 1, an infrared camera may be used. Alternatively, lightning means may be provided to light up a target area of the image capture carried out by the omnidirectional camera 1. These arrangements allow easy and secure comprehension of the surroundings at night around the vehicle in the parked state.

Further, in the present system, the image capture is carried out in all the directions by the omnidirectional camera 1, but the present invention is not limited to this. For example, the image capture may be selectively carried out in such a direction in which the blind spot for the driver occurs, for example those areas in the front, the left, the right, and the rear with respect to the vehicle where the driver cannot directly check with eyes or cannot indirectly check with the door mirror, a rearview mirror, and the like.

Further, the direction of capturing a required image may be selectable (customizable) in accordance with driver's preference or driving characteristics. In this case, it is preferable that the input section be provided to receive the driver's instruction.

Further, as described above, the present system includes the liquid crystal panel 7 having the very wide screen whose aspect ratio is 7:3 or greater. In contrast, most of onboard display devices for a navigation system or a television broadcasting have an aspect ratio of 4:3. Therefore, as compared with the conventional display devices, the liquid crystal panel 7 provides an extra (additional) display region having a shape wider than a square whose aspect ratio is 3:3. The extra display region can be used for a display of the speed meter such as a round-shaped speed meter which is commonly used because it is easiest to read (legible). The liquid crystal display 7 allows a speed meter to be displayed on the extra display region having a shape wider than the square mentioned above in such a manner that the speed meter has such a large size sufficiently using a shorter side of the extra display region. This makes it easier for the driver to read the speed meter, and thus improves the safety in driving.

Some recent display device has an aspect ratio of 15:9 for a display of a navigation system. In order to display such a navigation system on the liquid crystal panel 7, the aspect ratio of the liquid crystal panel 7 may be set at 24:9 or greater. Likewise, some display device for television has an aspect ratio of 16:9. In order to display a television broadcasting content on the liquid crystal panel 7, the aspect ratio of the liquid crystal panel 7 may be set at 25:9 or greater. There is no particular upper limit value in the aspect ratio as long as the shorter side of the liquid crystal panel 7 has a predetermined length or longer, and as long as resolution is at a predetermined value or greater.

Further, it is preferable that the liquid crystal panel 7 have 486 or more scan lines parallel to the longer side of the liquid crystal panel 7. In this case, the liquid crystal panel 7 can accommodate two display regions in W-QVGA format (Wide Quarter Video Graphics Array; 400×234) in such a manner that the two display regions are aligned vertically. With this arrangement a plurality of images such as the image of the navigation system and the rear view image with respect to the vehicle can be displayed in such a manner that they can be sufficiently easy to recognize what is displayed.

Further, in an arrangement of the liquid crystal panel 7 including 400 or more scan lines along the longer side, the image captured by the omnidirectional camera 1 may be displayed in such a manner that a longer side of the image is parallel to the shorter side of the liquid crystal panel 7. In this case, for example, an image of left or right side with respect to the vehicle is captured by the omnidirectional camera 1 and is displayed on the vertical side (shorter side) of the liquid crystal panel 7. This makes it easier to recognize what is displayed. Further, a commercially available graphic chip can be used for the arrangement. Therefore, with this arrangement, a manufacturing cost can be reduced.

Further, in the arrangement including 400 or more scan lines along the longer side, the image captured by the omnidirectional camera 1 may be displayed in such a manner that a shorter side of the image is parallel to the shorter side of the liquid crystal panel 7. In this case, for example, an image front or rear with respect to the vehicle is captured by the omnidirectional cameral 1, and is displayed on a horizontal side (longer side) of the liquid crystal panel 7. This makes it easier to recognize what is displayed. Further, this system may be arranged such that the captured image is displayed on the liquid crystal panel 7 in either portrait or landscape orientation in accordance with a capturing direction of an image captured by the omnidirectional camera 1.

Moreover, when the present system displays the image captured by the omnidirectional camera 1, ways of displaying the speed meter, the engine speed meter, the fuel gauge, and the like may be changed. For example, instead of displaying image of these meters for the gauges, still the gauges may be illustrated merely in numbers or in graph, thereby reducing the display region for the meters even though the driver still can read the gauges. This widens the display region for the image captured by the omnidirectional camera 1, so that the driver can more accurately grasp the surroundings of the vehicle.

In the case where the size of the display region for the image captured by the omnidirectional camera 1 is changeable, it is preferable that a display line on one side (one end portion) of the display region be kept at a constant position even when changing the size. If the image is not displayed according to such a reference point and is displayed in various positions, an edge (end portion) of the displayed image is moved. This possibly distracts driver's attention, and makes it difficult to recognize what is displayed. For prevention of such unnecessary movement of the image in the case where the display region is changeable, a fixed reference point (one side of the display region) is determined. This allows realization of the liquid crystal panel 7 by which the driver can comfortably check the displayed image.

In the present system, the gauges necessary for the driving, and the image captured by the omnidirectional camera 1 are displayed together on the display panel 7; however, the present invention is not limited to this arrangement. For example, the gauges and the image may be displayed on different panels that are provided individually.

Further, the present system uses the liquid crystal panel 7 as the display section; however, the present invention is not limited to this. The display section of the present system may be any types of display panels that can display the image captured by the omnidirectional camera 1. Examples of such display panels are: an organic EL (Electro Luminescence) panel, a plasma display panel, a CRT (Cathode Ray Tube), and the like display device.

Further, the present system may further include a display device (fail-safe system) for fear of emergencies such as (i) breakdown of the liquid crystal panel, and (ii) fail of attaining practically desired response speed due to a low temperature. However, even in such cases, the gauges such as the speed meter need to be appropriately displayed in order to let the drive to continue driving safely. For this reason, the present system may include the emergency display device (not shown) made up of a transparent EL (electro-luminescence) panel. With this, even when the liquid crystal panel 7 is broken or the display deficiency occurs, the driver can do safe driving by way of the speed meter and the like displayed on the emergency display device.

Further, in the present system, the display panel 7 displays both the gauges such as the speed meter, and the image captured by the omnidirectional camera 1. In this case, the gauges may become difficult to read when, for example, brightness of the other display region is far above brightness of the display region for the gauges. In order to prevent this, it is preferable to arrange the present system so that the brightness of the other display region does not exceed the brightness of the display region for the gauges. For example, when the brightness of the other display region becomes higher than the brightness of the display region for gauges, the brightness of the other display region may be decreased as lower than the brightness of the display region for the gauges. Alternatively, the brightness of the other display region may be restricted not to be higher than a predetermined threshold so that it will not be higher than the threshold.

Further, as described above, the display panel 7 in the present system also displays the image indicating the vehicle state together with the image of the vehicle, in addition to the speed meter and the image captured by the omnidirectional camera 1. The vehicle state displayed on this occasion is not limited to the aforementioned opening and closing of the door. For example, there may be provided various in-vehicle sensors, and the vehicle state according to detection results by the sensors may be displayed on the display panel 7. In this case, the vehicle state may be displayed by using a graphic image that is stored beforehand in the image DB and that is selected according to the detection results of the in-vehicle sensors.

Examples of such in-vehicle sensors include: the ignition instruction detection sensor 2; the speed sensor 3; the door open/close sensor 4; the parking brake sensor 5; a tire pressure detection sensor for detecting tire pressure of each tire; an in-vehicle temperature sensor for measuring temperature in the vehicle; an outside temperature sensor for measuring temperature outside the vehicle; a sticking object sensor for detecting whether or not something (such as a hand or a leg of the passenger) sticks out of a window of the vehicle; a lamp sensor for detecting whether or not it is possible to signal lamps such as a brake lamp, a direction indicator, and a head lamp; a fuel sensor for detecting a remaining amount of fuel; a seatbelt sensor for detecting whether a seatbelt is fastened or not; a steering sensor for detecting a steering angle of the steering wheel; a shift position sensor for detecting a shift position; various remaining amount sensors for detecting remaining amounts of various fluids such as brake oil, engine cooling water, power-steering oil, battery fluid, and washer fluid; an oil quality deterioration sensor for detecting degree of deterioration of the engine oil; a tire wear sensor for detecting a remaining amount of tire thread; a brake pad wear sensor for detecting how much a brake pad is worn; an electric system malfunction detection sensor for detecting whether or not there is a malfunction in an electric wiring system; an battery sensor for detecting a charge amount of a battery; a distance sensor (object sensor) for measuring a distance between the vehicle and obstacles (e.g., a parked vehicle adjacent to the vehicle, and a wall) around the vehicle; a direction sensor for detecting which direction the vehicle is in. In other words, the examples of the in-vehicle sensors can include any sensors for detecting states and situations both inside and outside of the vehicle.

Note that timings for detecting the vehicle state by the sensors are not particularly limited. The detection timings may be determined according to each characteristic of the sensors so that the driver can check the detection results when starting the vehicle. For example, the detections may be carried out in synchronization with the turning of the ignition key to the ON position, or with the opening and closing, or the unlocking of the door.

Further, a direction of the displayed image of the vehicle may be changed according to the detection result of the direction sensor.

Further, among the detection results of the sensors, information displayed on the liquid crystal panel 7 may be only about a factor that possibly works against the driving. A judgment on whether or not a factor possibly works against the driving is made by the CPU 10. In this case, the judgment may be carried out, for example, as follows. That is, there is provided a database (not shown) containing an acceptable value for the detection result of each sensor, and the CPU 10 compares the detected value of the sensor with the acceptable value for the detection result.

The system of the present invention may be arranged such that the information about the factor, which the CPU 10 judges that it possibly works against the driving, may stop being displayed on the liquid crystal panel 7 when the factor is removed by, for example, driver's reaction.

Further, when there is an obstacle, a warning may be displayed on the liquid crystal panel 7. Alternatively, the warning may be notified by sound (voice) from an additionally provided audio output device. Furthermore, in order to call driver's attention to the obstacle, a zoom process section may be provided. The zoom process section carries out a digital process with respect to an image of obstacle so as to obtain a zoomed obstacle image, and displays the zoomed obstacle image.

Further, the arrangement including the steering sensor and the distance sensor may further include a database storing (i) data of the shape of the vehicle, and (ii) data of a relation between the steering angle and radius gyration of the vehicle. According to the database and the detection results of the steering sensor and the distance sensor, the CPU 10 may calculate and show, to the driver, an appropriate steering amount (steering angle) for avoiding collision with an obstacle or the like when starting the vehicle. The steering angle may be exhibited by displaying an image indicating a steering direction.

Alternatively, the arrangement may include the steering sensor and the database storing (i) the data of a relation between the steering angle and radius gyration of the vehicle; and (ii) the like. The CPU 10 may calculate, based on the database and the detection result of the steering sensor, an appropriate steering amount (steering angle) allowing no collision with an obstacle or the like when starting the vehicle, and show the calculated steering amount to the driver. The steering angle may be exhibited by displaying an image indicating a steering direction.

In these arrangements, the CPU 10 serves as vehicle situation check means and vehicle situation judgment means. The vehicle situation check means recognizes the detection results of the sensors and the result of the image capture carried out by the omnidirectional camera 1. The vehicle situation judgment means judges whether or not the detection results and the result of the image capture include the factor that possibly works against the driving.

Further, the CPU 10 may detect the situation of the vehicle in accordance with the detection result of the object sensor and with the image captured by the omnidirectional camera 1. Moreover, according to the detected result, the CPU 10 may carry out selection of images indicating the vehicle state and display the selected image. Further, the CPU 10 may detect which direction the vehicle is in with respect to a major road (the widest portion of a road facing the parked vehicle), and may display the image of the vehicle in conformity with the direction.

Further, in the present system, upon the detection of the factor that possibly works against the driving, an animation image may be displayed on the liquid crystal panel 7 to advise how to react to the factor. In this case, the present system may include a database (not shown) that beforehand stores (i) an item that is possibly detected as the factor which possibly works against the driving; and (ii) ways of reacting to the factor.

On this account, even when detecting the factor that possibly works against the driving, the driver can easily and accurately react to the factor. For example, when the tire pressure is extremely low, animation images are displayed, instructing a way of setting up an emergency triangle warning; an area where a spare tire and a tire exchanging tool are stored; usage of the tool; procedures of exchanging tires; and the like.

Further, the information indicating the vehicle state may be image data that is selected from the image DB. Specifically, the CPU 10 may recognize the surroundings around the vehicle in accordance with the image data captured by the omnidirectional camera 1, and may select image data that matches with the recognized image data, and may display the selected data together with the image of the vehicle. For example, when there are an obstacle and the like around the vehicle, the CPU 10 may recognize shapes of them, and select respective images, from the image DB, similar to the shapes, and display the selected images.

Further, in the present system, the vehicle state is displayed together with the image of the vehicle; however, this is not only an arrangement of the present system. For example, the detection results of the sensors may be solely displayed. However, by displaying the vehicle state together with the image of the vehicle, the driver can surely and promptly recognize which part of the vehicle is responsible for the factor that possibly works against the driving. Therefore, it is preferable that the vehicle state be displayed together with the image of the vehicle. Moreover, the image of the vehicle may be displayed away from the speed meter.

Further, in the present system, the vehicle state is displayed, adjacent to the speed meter, together with the image of the vehicle; however, the present system is not limited to this. However, by displaying the vehicle state adjacent to the speed meter, the driver does not need to look more than one part of the display panel to check the vehicle state. This can reduce load imposed on the driver, and can prevent oversight of checking the vehicle state.

Further, data addition and data amendment may be carried out with respect to the image DB storing the graphic images indicating the vehicle and the vehicle state. In this case, when the vehicle body is repainted or modified, the image of the vehicle can be changed in accordance with the modified or repainted vehicle body. The change of the image of the vehicle may be carried out by using data downloaded via communication line; data read from an external memory; and data selected from data stored beforehand in a large volume HD (hard disk) provided in the present system.

Further, in addition to the arrangement, the present system may further include a speaker (audio output means). In this case, the direction of the image displayed on the liquid crystal panel 7 may be notified by voice (sound).

Further, in the case where the present system is able to detect the factor judged that it possibly works against the driving, existence of the factor may be notified by both the display on the liquid crystal panel 7, and voice (sound) outputted from the speaker. In this case, warning sound or voice may be used to notify (i) an area responsible for the existence of the factor judged that it possibly works against the driving, and (ii) things to be bewared.

Further, the present system may further include a communication device that is connectable to a communication line such as the Internet. In this case, the driver can check information about his/her destination before starting moving the parked vehicle. For example, in cases where the driver goes to a movie theater, the driver can beforehand check a content of a movie that is on now, and can check traffic information of roads to the theater. Moreover, the driver can buy a ticket and can reserve a seat. Further, by using the communication device, the driver can reserve a restaurant, and can view a menu of the restaurant, and can make an order.

Further, the present system may execute various kinds of application software for use in a personal computer. In this case, a network meeting can be held by using the present system. In other words, the liquid crystal panel 7 can be also used as a personal computer monitor. In the case where the present system can execute various kinds of application software, the application software can be displayed, e.g. on a full screen, that is, on an entire display region of the liquid crystal panel 7.

Further, in the case where the present system is capable of communication, the activation of the present system may be carried out via the communication network. Further, the image captured by the omnidirectional camera 1 may be transmittable via the communication line. In this case, it is possible to remotely carry out (i) the activation of the present system, and (ii) the check of the captured image of the surroundings of the vehicle, the image being captured by the omnidirectional camera 1.

Further, in the present system, designs of the items displayed on the liquid crystal panel 7 may be customizable by the driver. Examples of the customizable designs may include: sizes, colors, layouts (display positions) of the speed meter, the engine speed meter, and the fuel gauge. However, because an item such as the speed meter is important for the safe driving, it is preferable that the customization of design of an item required for the safe driving be allowed within a predetermined condition range, in order that it may be sufficiently easy to recognize the content of the item. For this reason, the present system may include, for example, a database (not shown) storing such customizable ranges that respectively correspond to the display items. Further, in the case where the present system is capable of communication, such a database may be provided on a server. From the database, a design within the customizable range may be selectable according to driver's preference. Further, when the design customized according to driver's instruction is out of the customizable range, amendment may be made so that the design customized according to the driver's instruction falls within the customizable range.

Further, the above explanation assumes that the power source of the present system is the engine start battery; however, the power supply means for the present system is not limited to this and is arbitrarily changeable. For example, there may be provided power supply means exclusively used for the present system.

Further, the present system is provided in a vehicle, and the wording "vehicle" in the description encompasses any kind of terrestrial transportation device, such as an automobile, a motorcycle, and a bicycle. Moreover, the present system is applicable not only to the vehicle but also to any types of transportation device requiring manual maneuver. Examples of such a transportation device include: a helicopter, an airplane, and a ship.

Further, the above explanation assumes that the present system shows, to the driver, the surroundings around the vehicle when starting moving the vehicle in the parked state (stop state); however, the present system is not limited to this. For example, the present system may shows, to the driver, the image captured by the omnidirectional camera 1 when stopping or parking the vehicle or the like. Further, the image captured by the omnidirectional camera 1 may be shown to the driver in response to the driver's instruction.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

For example, the control section 6 of the present system may be constituted by hardware logic, or by software with the use of a CPU as follows.

That is, the present system has: (i) the CPU for executing an instruction of control program realizing various functions; (ii) a ROM storing the program; (iii) a RAM for expanding the program; (iv) a storage device (storage medium) such as a memory storing the program and various data; and (v) the like. The object of the present invention also can be achieved by (i) providing, for the present system, a storage medium storing, in a computer readable manner, a program code (executable program; intermediate code; source program) of the control program for the present system, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a hard disk and a flexible disk; (iii) optical disks such as a CD-ROM (compact disk read only memory), a magnetic optical disk (MO), a mini disk (MD), a digital video disk (DVD), and a CD-R (CD-Rewritable); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

The present system may be connectable to the communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, a ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

INDUSTRIAL APPLICABILITY

The surroundings exhibiting system and the surroundings exhibiting method of the present invention are applicable to any kinds of transportation device requiring manual maneuver for traveling. Examples of such transportation device include: an automobile, a motorcycle, a bicycle, a helicopter, an airplane, and a ship.

The invention claimed is:

1. A surroundings exhibiting system for use in a transportation device, the surroundings exhibiting system comprising:
   an image capturing section arranged to capture a multi-directional image of the surroundings of the transportation device;
   a display section arranged to display at least a portion of the multi-directional image captured by the image capturing section;
   a door sensor arranged to detect at least one of unlocking a door, opening the door, and closing the door; and
   an ignition instruction detection sensor arranged to detect an operator's ignition instruction to the transportation device; wherein
   the image capturing section is arranged to capture an image in synchronization with the detection of the at least one of unlocking the door, opening the door, and closing the door; and
   the display section is arranged to display the image captured by the image capturing section in synchronization with the ignition instruction to show the operator the surroundings of the transportation device in a stopped state.

2. The surroundings exhibiting system as set forth in claim 1, wherein:
   the image capturing section captures an omnidirectional image with respect to the transportation device.

3. The surroundings exhibiting system as set forth in claim 1, further comprising:
   a frame memory arranged to store image data of the multi-directional image captured by the image capturing section; wherein the image data of the multi-directional image captured by the image capturing section is stored in the frame memory; and a most recent image data among the image data stored in the frame memory is displayed on the display section upon the detection of the ignition instruction.

4. A surroundings exhibiting method of a transportation device, the method comprising the steps of:

detecting at least one of unlocking a door, opening the door, and closing the door;

starting capturing a multi-directional image of the surroundings of the transportation device in synchronization with the detection of the at least one of unlocking the door, opening the door, and closing the door;

detecting an operator's ignition instruction to the transportation device; and starting displaying at least a portion of the multi-directional image captured in the image capture step in synchronization with the ignition instruction to show the operator the surroundings of the transportation device in a stopped state.

5. A method for controlling a surroundings exhibiting system of a transportation device, the method comprising:

a process of detecting at least one of unlocking a door, opening the door, and closing the door;

an image capture start process of causing an image capturing section to start capturing a multi-directional image of surroundings of the transportation device in synchronization with the detection of the at least one of unlocking the door, opening the door, and closing the door;

a process of detecting an operator's ignition instruction to the transportation device; and a display start process of causing a display section to start displaying at least a portion of the image captured by the image capturing section in synchronization with the ignition instruction to show the operator the surroundings of the transportation device in a stopped state.

6. A computer-readable storage medium including a surroundings exhibiting system control program for causing a computer to execute the method as set forth in claim 5.

* * * * *